(12) United States Patent
Inoue et al.

(10) Patent No.: US 7,025,392 B2
(45) Date of Patent: Apr. 11, 2006

(54) JOINT CONSTRUCTION FOR CABLE PIPING

(75) Inventors: Hiroshi Inoue, Kawachinagano (JP);
Tamotsu Takada, Kawachinagano (JP);
Tetsumi Kondoh, Tokyo (JP);
Yoshihisa Kariyazono, Kimitsu (JP)

(73) Assignees: Higashio Mech Co., Ltd.,
Kawachinagano (JP); Nippon Steel Corporation, Tokyo (JP)

( * ) Notice: Subject to any disclaimer, the term of this patent is extended or adjusted under 35 U.S.C. 154(b) by 140 days.

(21) Appl. No.: 10/702,575

(22) Filed: Nov. 7, 2003

(65) Prior Publication Data

US 2004/0096265 A1    May 20, 2004

(30) Foreign Application Priority Data

Nov. 20, 2002   (JP)   ............................. 2002-336852

(51) Int. Cl.
*F16L 15/02*   (2006.01)

(52) U.S. Cl. ....................... 285/302; 285/340; 285/32
(58) Field of Classification Search ................ 285/340, 285/298, 301, 100, 95, 109, 145.1, 145.4, 285/383, 224, 32
See application file for complete search history.

(56) References Cited

U.S. PATENT DOCUMENTS

| | | | | | |
|---|---|---|---|---|---|
| 2,846,242 | A | * | 8/1958 | Drake | ......................... 285/263 |
| 2,956,823 | A | * | 10/1960 | Benjamin, Jr. et al. | ..... 285/298 |
| 4,427,220 | A | * | 1/1984 | Decker | ...................... 285/263 |

FOREIGN PATENT DOCUMENTS

| | | |
|---|---|---|
| JP | 10-169865 | 6/1998 |
| JP | 3048559 | 5/2000 |

* cited by examiner

*Primary Examiner*—Aaron Dunwoody
(74) *Attorney, Agent, or Firm*—Armstrong, Kratz, Quintos, Hanson & Brooks, LLP (57) ABSTRACT

A joint construction for cable piping provided with an inner cylinder of thin wall pipe and an outer cylinder fitted on the inner cylinder so as to freely slide to connect a first pipe for cable to a second pipe for cable so as to freely expand and contract in length. A holding ring of a first seal member, tightly fit to a peripheral face of an end portion of the first pipe, a first stop ring of plate, hitching to the peripheral face of the end portion of the first pipe, and an opening end forming member, are unitedly fit by plastic working of an end of the inner cylinder. A holding groove of a second seal member, fit to a peripheral face of an end portion of the second pipe, is formed by plastic work of another end of the inner cylinder. A second stop ring, hitching on the peripheral face of the end portion of the second pipe, and an opening end forming member are unitedly fit by plastic work on an outer end side of the outer cylinder.

12 Claims, 5 Drawing Sheets

JOINT CONSTRUCTION FOR CABLE PIPING

BACKGROUND OF THE INVENTION

1. Field of the Invention

This invention relates to a joint construction for cable piping.

2. Description of the Related Art

Conventionally, as a joint construction for cable piping used to obtain an expansion length for earthquakes and a temperature change in pipings buried in the ground to include cables for communication and transmission, an end side of each of two second cylindrical bodies is inserted to both opening portions of a first cylindrical body, respectively, as to relatively move in an axis direction within a certain range, each of third cylindrical bodies being fitted onto another end of each of the second cylindrical bodies through a spherical joint respectively as to relatively oscillate, and both ends of this joint are flanged onto pipings (Japanese provisional publication No. 10-169865, or example).

However, for the cable piping buried in the ground, to secure the communication network uncut even in a large earthquake, a joint construction, which can obtain a larger expansion length than that of a conventional expansion joint, is required. Further, the conventional joint construction has a large number of parts including at least five cylindrical bodies, spherical working for the spherical joint is required, and assembly of the joint requires fastening with bolts and nuts because the piping to be connected to each of the both ends of the joint has a flange.

The inventors of the present invention have proposed a construction described in Japanese patent application number 10-317155 to secure sufficient expansion length as a joint construction for piping (Japanese Patent No. 3048559).

However, the joint construction proposed in Japanese patent application number 10-317155 has the following problems. That is to say, firstly, the production process is complicated because the number of parts is large and welding is needed for assembly. Secondly, when press-fitting (caulking) is applied instead of the welding, configurations of other parts not relating to the connection is deformed by working force (causing deformation). Third, the construction tends to generate problems in sealability as a joint having long expansion length. Fourth, the piping tends to be unexpectedly drawn out for insufficient rigidity of a hitching blade of a stop ring. Fifth, the piping is hard to insert in some cases. These remaining problems have been revealed.

It is therefore an object of the present invention to provide a joint construction for cable piping in which large expansion length in an axis direction of the piping can be secured with a simple construction having a small number of parts, and production is made easy.

BRIEF DESCRIPTION OF THE DRAWINGS

The present invention will be described with reference to the accompanying drawings, in which.

DESCRIPTION OF THE PREFERRED EMBODIMENTS

Preferred embodiments of the present invention will now be described with reference to the accompanying drawings.

Figure 1:
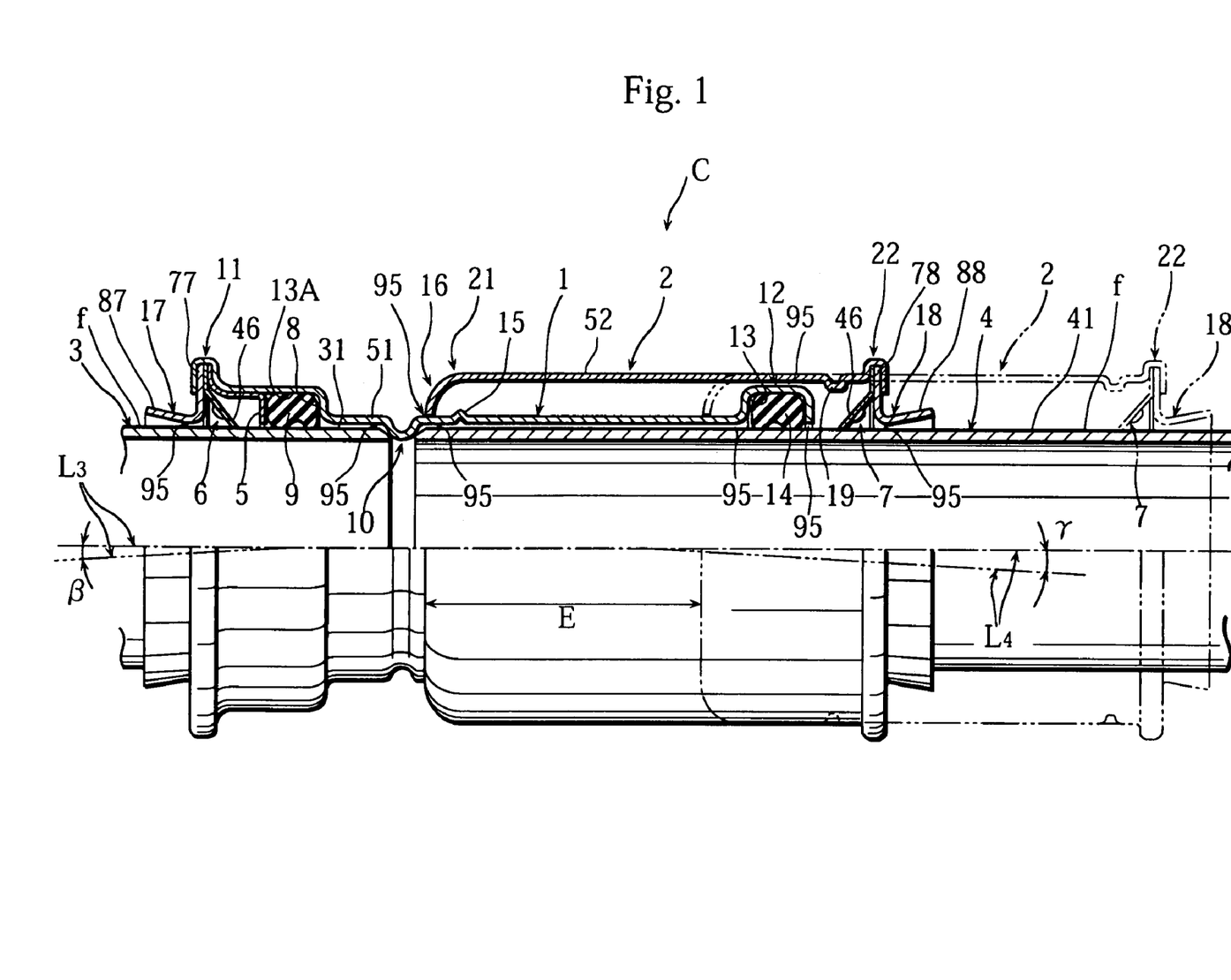
FIG. 1 is a half cross-sectional view of a principal portion showing an embodiment of a joint construction for cable piping of the present invention.
Figure 2:
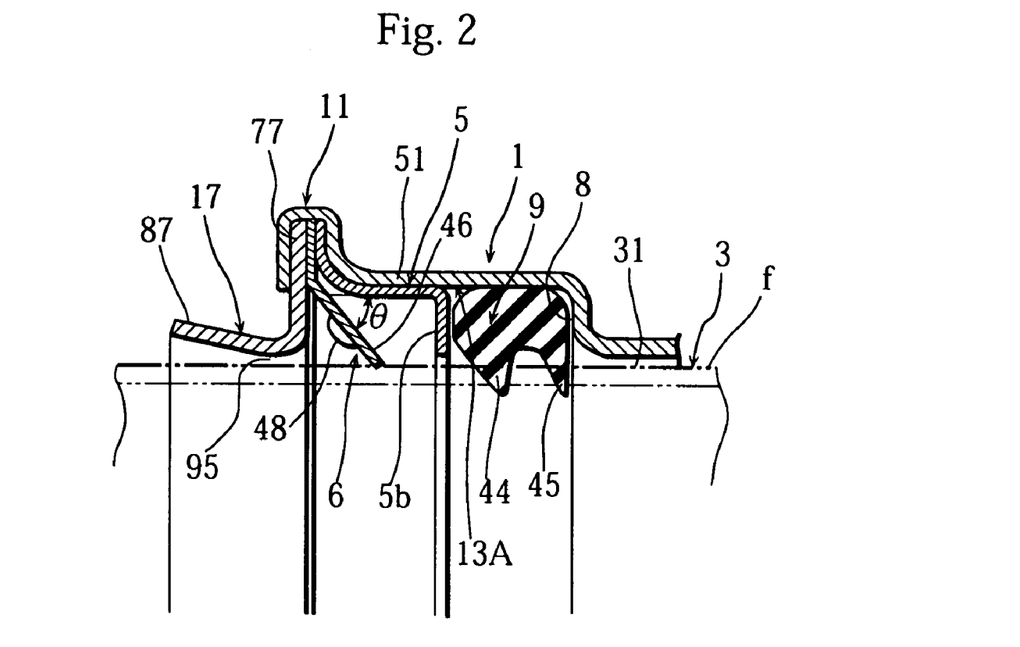
FIG. 2 is an enlarged cross-sectional view of a principal port ion.
Figure 3:
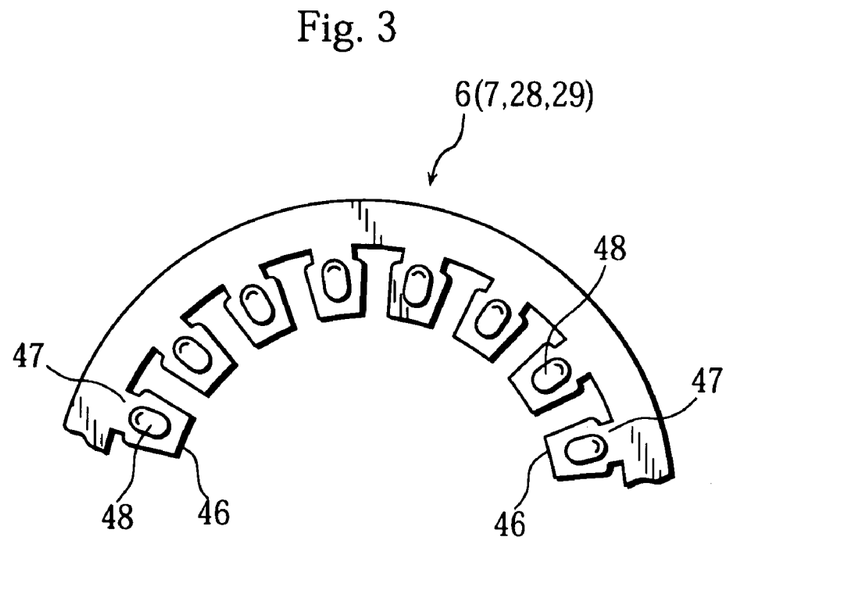
FIG. 3 is an enlarged view of a principal portion showing a first stop ring and a second stop ring.

FIGS. 1 through 5 show an embodiment of a joint construction for cable piping relating to the present invention. FIG. 3 shows an enlarged view of a principal portion of a first stop ring 6 (and 28) and a second stop ring 7 (and 29). As shown in FIGS. 1 through 5, a pipe joint C is provided with an inner cylinder 1 having an inner cylinder main body 51 (mainly) composed of steel pipe having thin wall and an outer cylinder 2, having an outer cylinder main body 52 (mainly) composed of steel pipe having thin wall and fitted onto the inner cylinder 1 as to freely slide to connect a first pipe 3 for cable to a second pipe 4 for cable as to freely expand and contract in length. According to the pipe joint C, the pipes have trackability even in a large earthquake when the pipes are buried in the ground. Although the present invention is especially appropriate for optical fiber cables, it is also appropriate for other kinds of communication and power transmission cables.

The inner cylinder 1 and the outer cylinder 2 have corrosion resistance (anti-corrosiveness) appropriate for burying formed by coating of vinyl chloride in which vinyl chloride powder is melted and placed on heated steel pipes to be formed into the inner cylinder main body 51 and the outer cylinder main body 52, and excess vinyl chloride is removed by air. Plastic corrosion-resistance (anti-corrosion) coating of other materials, such as polyethylene, polyvinyl chloride, nylon and fusion-bonded epoxy, may be also preferable on the inner cylinder main body 51 and the outer cylinder main body 52. The first pipe 3 and the second pipe 4 are covered by a plastic anti-corrosion layer f until connected ends respectively, and appropriate for burying under the ground.

A holding ring 5 of plate for a first seal member 9 tightly fit to a peripheral face 31 of the end portion of the first pipe 3, a first stop ring 6 of plate hitching onto the peripheral face 31 of the first pipe 3, and an opening end forming member 17 of plate are unitedly attached (fitted) to an end 11 of the inner cylinder 1 by plastic working (metal forming) on an end side of the inner cylinder main body 51.

Figure 4:
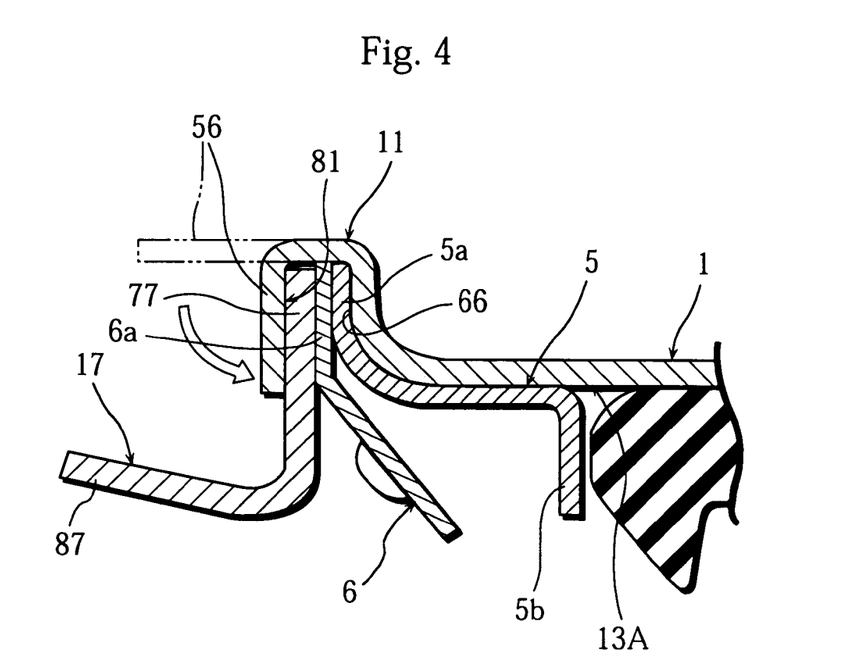
FIG. 4 is an enlarged cross-sectional view of a principal portion.

Concretely, in FIGS. 2 and 4, a peripheral staged portion 66 and a fitting piece portion 56 of short cylinder (shown with a two-dot broken lines) on an outer side of the peripheral staged portion 66 are formed on the end side of the inner cylinder main body 51. An outer brim portion 5a at right angles with an axis and formed on the holding ring 5, an outer brim portion 6a at right angles with the axis and formed on the first stop ring 6, and an outer brim portion 77 at right angles with the axis and formed on the opening end forming member 17, are fitted to the fitting piece portion 56 to contact the peripheral staged portion 66.

The fitting piece portion 56 is plastically worked (bent) from the position of the two-dot broken line to a position shown with a solid line, as shown with an arrow, to tightly pinch the outer brim portions and form a peripheral groove portion 81 of which the cross section is U-shaped opening toward an inside diameter direction to unitedly fit the above members 5, 6, and 17.

The opening end forming member 17 has a tapered short cylinder port ion 87 increasing in diameter toward the outer side in the axis direction, and the minimum diameter portion on an inner peripheral face of the opening end forming member 17 forms a micro gap 95 between the peripheral face 31 of the first pipe 3 to be inserted.

A holding staged portion 8 is formed on the inner cylinder 1 by plastic working on an inner side to the holding ring 5 of the inner cylinder main body 51. The first seal member 9 composed of rubber is fitted to a peripheral groove (holding portion) 13A composed of the holding staged portion 8, the inner peripheral face of the inner cylinder main body 51, and an inner brim portion 5b and opening toward the inside diameter direction.

A holding groove 13 of a second seal member 14 tightly fit to a peripheral face 41 of an and portion of the second pipe 4 is formed on another end 12 of the inner cylinder 1 as to be curved and opening toward the inside diameter direction by plastic working of the other end side of the inner cylinder main body 51 as to be open (U-shaped) toward the inside diameter direction. The second seal member 14 composed of rubber is fitted to the holding groove 13.

A ring convex portion 10, disposed between connected ends of the first pipe 3 and the second pipe 4, is formed on a middle part of the inner cylinder 1 by plastic working on the inner cylinder main body 51 so as to be convex on the inner peripheral face side. Instead of the ring convex portion 10, plural small inward protruding portions, disposed between the connected ends of the first pipe 3 and the second pipe 4, may be formed on the middle part of the inner cylinder 1 in the peripheral direction by plastic working on the inner cylinder main body 51 as to be parted from each other (with a predetermined pitch).

Plural protruding portions 15 are formed near the ring convex portion 10 and on another end 12 side in the peripheral direction as to be parted from each other (with a predetermined pitch). Instead of the plural protruding portions 15, a ring protruding portion may be formed along the peripheral direction of the inner cylinder 1.

Figure 5:
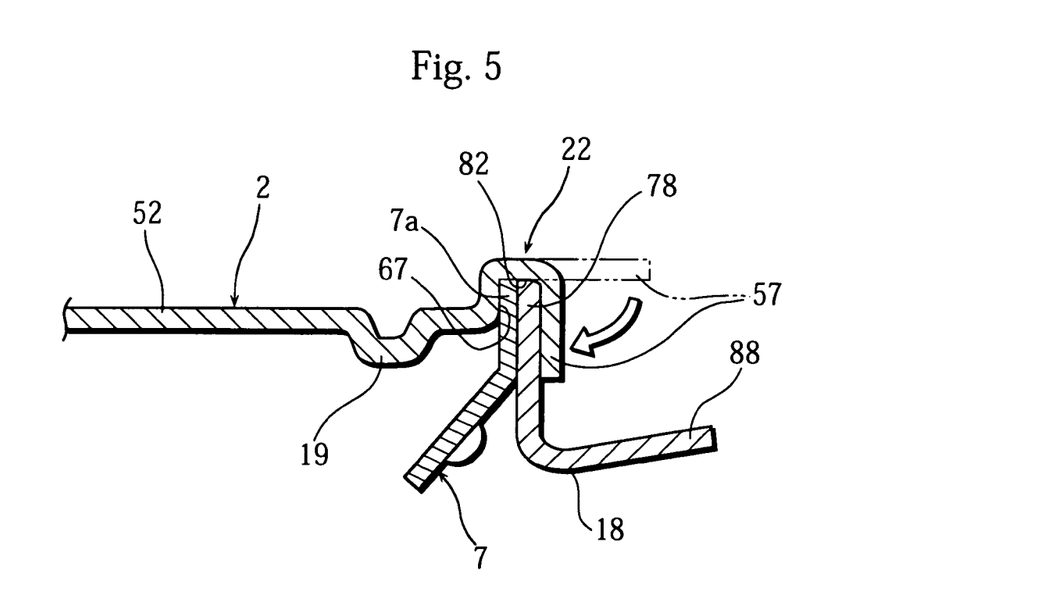
FIG. 5 is an enlarged cross-sectional view of a principal portion.

A second stop ring 7 hitching onto the peripheral face 41 of the end portion of the second pipe 4 and an opening end forming member 18 are attached (fitted) to an outer end 22 of the outer cylinder 2 by plastic working on the outer end side of the outer cylinder main body 52 without welding.

Concretely, in FIG. 5, a peripheral staged portion 67 and a fitting piece portion 57 of short cylinder (shown with a two-dot broken lines) on an outer side of the peripheral staged portion 67 are formed on the end side of the outer cylinder main body 52. An outer brim portion 7a at right angles with the axis and formed on the second stop ring 7 and an outer brim portion 78 at right angles with the axis and formed on the opening end forming member 18, are fitted to the fitting piece portion 57 to contact the peripheral staged portion 67.

The fitting piece portion 57 is plastically worked from the position of the two-dot broken line to a position shown with a solid line as shown with an arrow to tightly pinch the outer brim portions and form a peripheral groove portion 82 of which cross section is U-shaped opening toward the inside diameter direction to unitedly fit the above members 7 and 8.

The opening end forming member 18 has a tapered short cylinder portion 88 increasing in diameter toward the outer side in the axis direction, and the minimum diameter portion on an inner peripheral face of the opening end forming member 18 forms a micro gap 95 between the peripheral face 41 of the second pipe 4 (to be inserted).

A sliding portion 16 sliding on the periphery of the inner cylinder 1 is formed on an inner end 21 of the outer cylinder 2 by plastic working on the inner end side of the outer cylinder main body 52 as to be bent to decrease in diameter. In the Figures, the sliding portion 16 has a peripheral end portion vertically sliding on the periphery of the inner cylinder 1. Although not shown in the Figures, the sliding portion 16 may be formed into a short cylinder as the inner peripheral face of the sliding portion 16 slides along the outer peripheral face of the inner cylinder 1.

Plural stopping protrusions 19 which can contact the end 12 are disposed on the outer end side of the outer cylinder 2 in the peripheral direction (with a predetermined pitch) by plastic working on the outer end side of the outer cylinder main body 52 not to let the second stop ring 7 contact the end 12 of the inner cylinder 1. A ring protrusion which can contact the end 12 may be formed (in the peripheral direction) on the outer end side of the outer cylinder 2.

Each of the above-described first seal member 9 and the second seal member 14 has two rows of sealing tongue portions 44 and 45 protruding in the inside diameter direction. Each of the sealing tongue portions 44 and 45 elastically deforms to be tightly fit to the peripheral face 31 of the first pipe 3 and the peripheral face 41 of the second pipe 4.

On the first stop ring 6, as shown in FIG. 3, plural inward-directed hitching blades 46 are formed continuously from the inner peripheral part of the outer brim portion 6a through elastically-deformable neck portions 47 formed by bending as to form a predetermined bending angle $\theta$ with an axis $L_3$ direction (of the first pipe 3).

The hitching blade 46 is formed into a trapezoid having a blade-shaped end to bite into the peripheral face 31 of the first pipe 3.

Also on the second stop ring 7, plural inward-directed hitching blades 46 are formed continuously from the inner peripheral part of the outer brim portion 7a through elastically-deformable neck portions 47 formed by bending as to form the predetermined bending angle .theta. with an axis $L_4$ direction (of the second pipe 4). The hitching blade 46 is similar to that of the first stop ring 6 (refer to FIG. 3).

The first stop ring 6 and the second stop ring 7 are preferably composed of plate members of aluminum or stainless steel having strength and elasticity.

The above-mentioned predetermined bending angle $\theta$ of the first stop ring 6 and the second stop ring 7 can be selected from and set within a range of $35° \leq \theta \leq 55°$. With this angle of inclination, the hitching blade 46 is easy to be fitted and hitched onto the peripheral faces 31 and 41.

Further, a small convex portion 48 is formed on each of the hitching blades 46 of the first and second stop rings 6 and 7. The small convex portion 48 increases strength of the hitching blade 46 and makes the hitching blade 46 easier to bite into the peripheral faces 31 and 41 of the first and second pipes 3 and 4.

Figure 6:
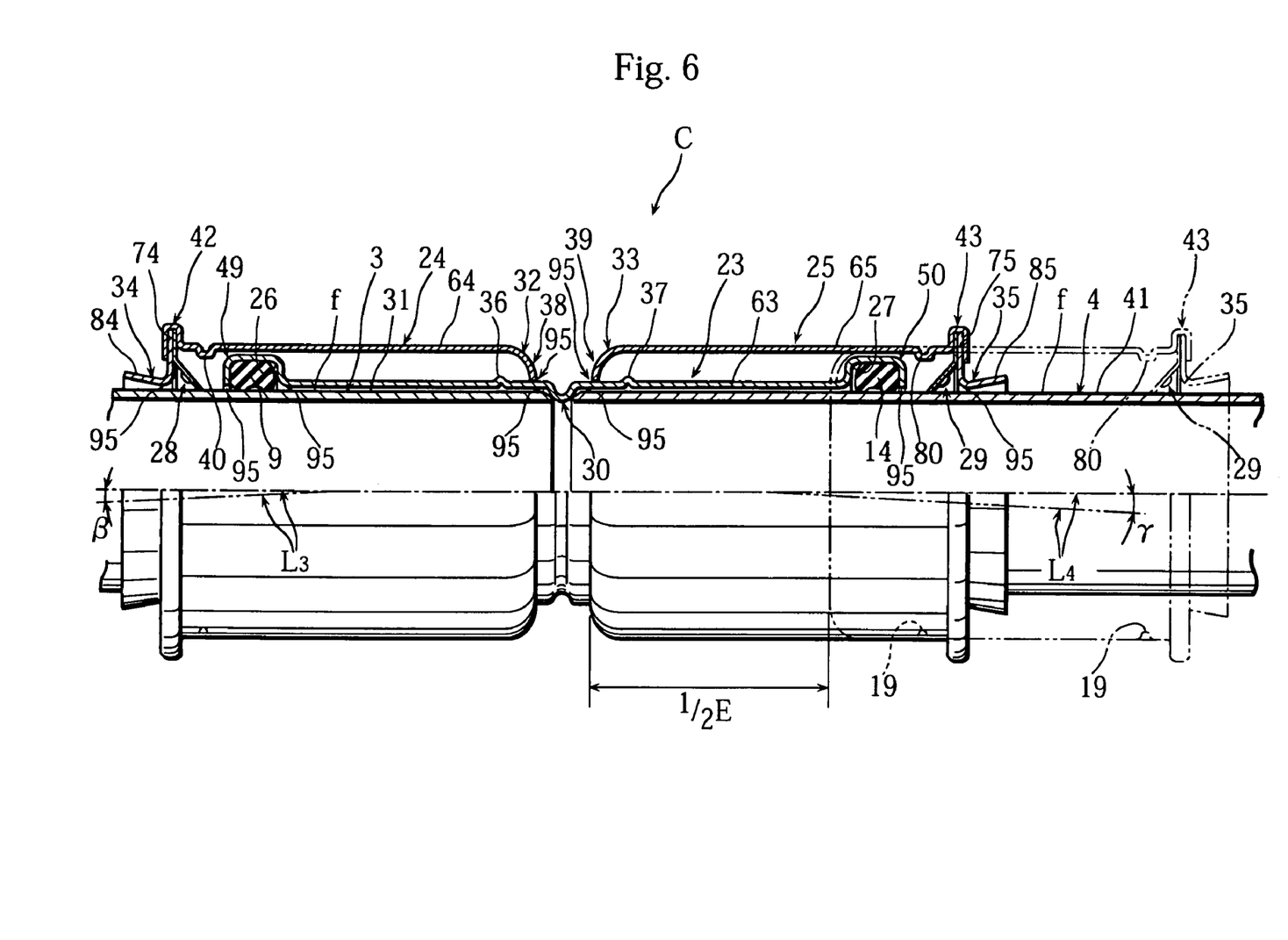
FIG. 6 is a half cross-sectional view of a principal portion showing another embodiment of the joint construction for cable piping of the present invention.
Figure 7:
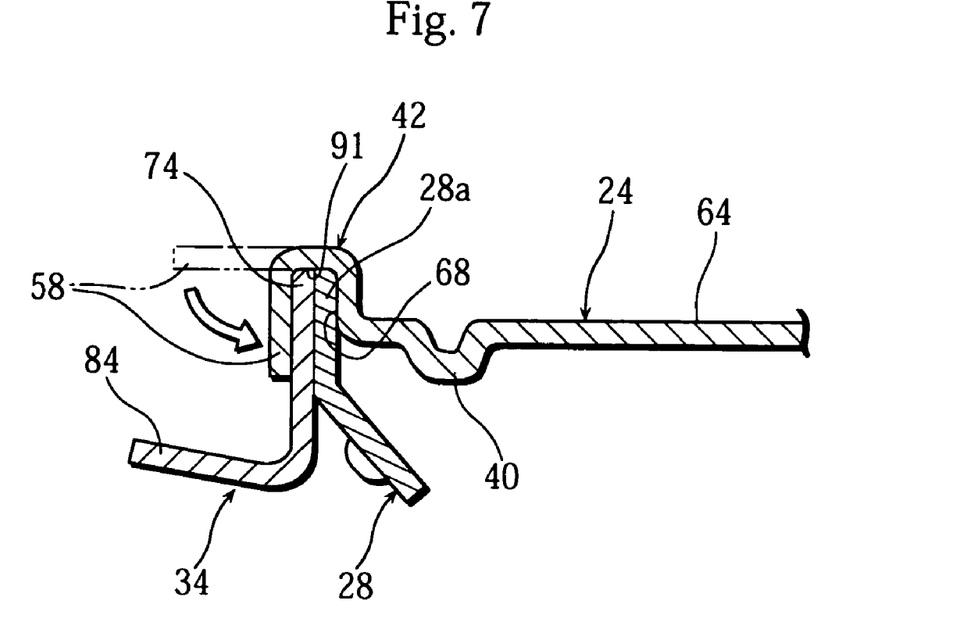
FIG. 7 is an enlarged cross-sectional view of a principal portion.
Figure 8:
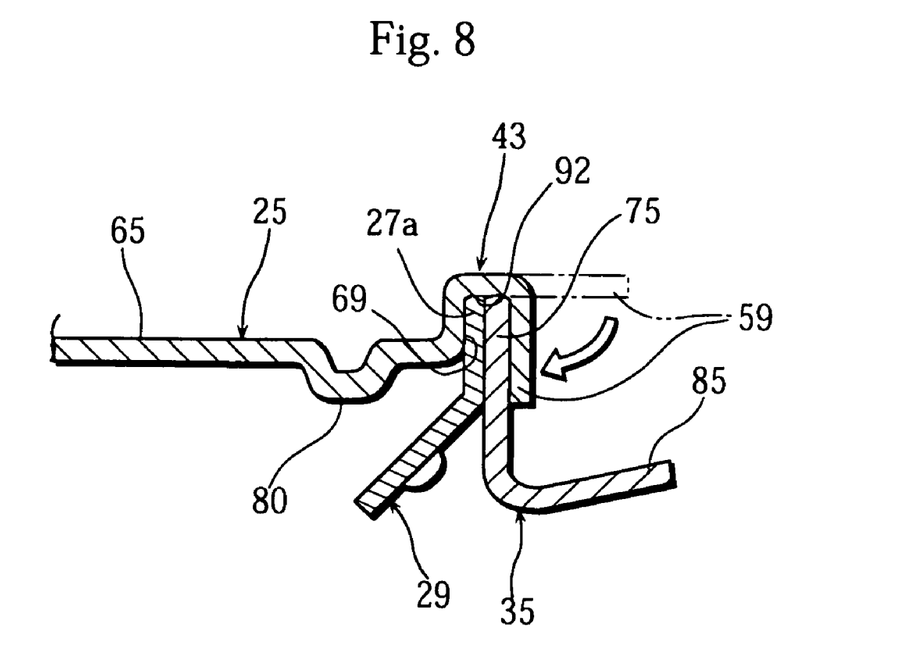
FIG. 8 is a working-explanatory view of a small-disc continuous body.

FIGS. 6, 7, and 8 show another embodiment of the joint construction for cable piping of the present invention. As shown in these Figures, a pipe joint C is provided with an inner cylinder 23 having an inner cylinder main body 63 of pipe having thin wall and a pair of first and second outer cylinders 24 and 25, having first and second outer cylinder main bodies 64 and 65 of thin-wall pipe and fitted onto the inner cylinder 23 so as to freely slide to form a symmetric construction which connects a first pipe 3 for cable to a second pipe 4 for cable as to freely expand and contract in length. With this construction, the pipes have trackability even in a large earthquake when the pipes are buried in the ground.

The inner cylinder 23, the first outer cylinder 24, and the second outer cylinder 25 have corrosion resistance (anti-corrosiveness) appropriate for burying by coating of vinyl chloride made by that vinyl chloride powder is melted and placed on heated steel pipes to be formed into the inner cylinder main body 63, the first outer cylinder main body 64, and the second outer cylinder main body 65, and excess vinyl chloride is removed by air. Plastic anti-corrosion coating of other materials may be also preferable on the inner cylinder main body 63, the first outer cylinder main body 64, and the second outer cylinder main body 65.

A holding groove 26 of a first seal member 9 tightly fit to a peripheral face 31 of the first pipe 3 is formed on an end 49 of the inner cylinder 23 so as to be curved by plastic working on the end side of the inner cylinder main body 63 so as to be open (U-shaped) toward the inside diameter direction. A holding groove 27 of a second seal member 14 tightly fit to a peripheral face 41 of an and portion of the second pipe 4 is formed on another end 50 of the inner cylinder 23 so as to be curved and opening toward the inside diameter direction by plastic working of the other end side of the inner cylinder main body 63 so as to be open (U-shaped) toward the inside diameter direction.

A ring convex portion 30, disposed between connected ends of the first pipe 3 and the second pipe 4, is formed on a middle part of the inner cylinder 23 by plastic working on the inner cylinder main body 63 as to be convex on the inner peripheral face side. Instead of the ring convex portion 30, plural small inward protruding portions, disposed between the connected ends of the first pipe 3 and the second pipe 4, may be formed on the middle part of the inner cylinder 23 in the peripheral direction by plastic working on the inner cylinder main body 63 so as to be parted from each other (with a predetermined pitch).

Plural protruding portions 36 are formed near the ring convex portion 30 and on the end 49 side of the ring convex portion 30 in the peripheral direction as to be parted from each other (with a predetermined pitch). Plural protruding portions 37 are formed near the ring convex portion 30 and on another end 50 side of. the ring convex portion 30 in the peripheral direction as to be parted from each other (with a predetermined pitch). Instead of the plural protruding portions 36 and 37, a ring protruding portion may be formed along the peripheral direction of the inner cylinder 23.

The first seal member 9 and the second seal member 14 have similar constructions to that of the seal members of the pipe joint C in FIGS. 1 and 2.

Next, a first stop ring 28 hitching onto the peripheral face 31 of the first pipe 3, and an opening end forming member 34 are unitedly fitted (fixed) to an outer end 42 of the first outer cylinder 24 by plastic working on an outer end side of the first outer cylinder main body 64 without welding, and a second stop ring 29 hitching onto the peripheral face 41 of the second pipe 4, and an opening end forming member 35 are unitedly fitted (fixed) to an outer end 43 of the second outer cylinder 25 by plastic working on an outer end side of the second outer cylinder main body 65 without welding.

Concretely, in FIG. 7, a peripheral staged portion 68 and a fitting piece portion 58 of short cylinder (shown with a two-dot broken lines) on an outer side of the peripheral staged portion 68 are formed on the outer end side of the first outer cylinder main body 64. An outer brim portion 28a formed, at right angles with an axis, on the first stop ring 28, and an outer brim portion 74 formed, at right angles with the axis, on the opening end forming member 34, are fitted to the fitting piece portion 58 to contact the peripheral staged portion 68.

The fitting piece portion 58 is plastically worked from the position of the two-dot broken line to a position shown with a solid line as shown with an arrow to tightly pinch the outer brim portions and form a peripheral groove portion 91 of which cross section is U-shaped opening toward an inside diameter direction to unitedly fit the above members.

In FIG. 8, a peripheral staged portion 69 and a fitting piece portion 59 of short cylinder (shown with a two-dot broken lines) on an outer side of the peripheral staged portion 69 are formed on the outer end side of the second outer cylinder main body 65. An outer brim portion 29a formed, at right angles with the axis, on the second stop ring 29, and an outer brim portion 75 formed, at right angles with the axis, on the opening end forming member 35, are fitted to the fitting piece portion 59 to contact the peripheral staged portion 69.

Then, the fitting piece portion 59 is plastically worked from the position of the two-dot broken line to a position shown with a solid line as shown with an arrow to tightly pinch the outer brim portions and form a peripheral groove portion 92 of which a cross section is U-shaped opening toward an inside diameter direction to unitedly fit the above members.

A first sliding portion 38 sliding on the periphery of the inner cylinder 23 is formed on a first inner end 32 of the first outer cylinder 24 by plastic working on the inner end side of the first outer cylinder main body 64 as to be curved to decrease in diameter, and a second sliding portion 39 sliding on the periphery of the inner cylinder 23 is formed on a second inner end 33 of the second outer cylinder 25 by plastic working on the inner end side of the second outer cylinder main body 65 as to be curved to decrease in diameter. In FIG. 6, each of the first and second sliding portions 38 and 39 has a peripheral end portion vertically sliding on the periphery of the inner cylinder 23. Although not shown in the Figures, each of the first and second sliding portions 38 and 39 may be formed into a short cylinder as the inner peripheral faces of the first and second sliding portions 38 and 39 slide along the outer peripheral face of the inner cylinder 1.

The opening end forming member 34 has a tapered short cylinder portion 84 increasing in diameter toward the outer side in the axis direction, the opening end forming member 35 has a tapered short cylinder portion 85 increasing in diameter toward the outer side in the axis direction, and the minimum diameter portion on an inner peripheral face of the opening end forming members 34 and 35 form micro gaps 95 between the peripheral face 31 of the first pipe 3 and the peripheral face 41 of the second pipe 4 (to be inserted).

Plural stopping protrusions 40 which can contact the end 49 of the inner cylinder 23 are disposed on the outer end side of the first outer cylinder 24 in the peripheral direction (with a predetermined pitch) by plastic working on the outer end side of the first outer cylinder main body 64 so to prevent the first stop ring 28 from contacting the end 49 of the inner cylinder 23. Further, plural stopping protrusions 80 which can contact the end 50 of the inner cylinder 23 are disposed on the outer end side of the second outer cylinder 25 in the peripheral direction (with a predetermined pitch) by plastic working on the second outer cylinder main body 65 so as to prevent the second stop ring 29 from contacting the end 50 of the inner cylinder 23. Instead of the stopping protrusions 40 and 80, a ring protrusion which can contact the end 49 or the end 50 may be respectively formed on the first and second outer cylinder main bodies 64 and 65.

The first stop ring 28 is formed by bending inward from the inner peripheral part of the outer brim portion 28a as to form a predetermined bending angle θ with an axis $L_3$ direction of the first pipe 3, and the second stop ring 29 is formed by bending inward from the inner peripheral part of the outer brim portion 29a as to form the predetermined bending angle θ with an axis $L_4$ direction of the second pipe 4.

The first stop ring 28 and the second stop ring 29 have plural hitching blades 46 through elastically-deformable neck portions 47 similar to the first and second stop rings 6 and 7 (described with FIG. 3), and the hitching blade 46 has a small convex portion 48 for reinforcement.

Next, the function of the joint construction is described in detail.

Firstly, in the pipe joint C shown in FIGS. 1 through 5, the first pipe 3 is inserted to the opening end forming member 17 of the inner cylinder 1 to contact the ring convex portion 10 and the second pipe 4 is inserted to the opening end forming member 18 of the outer cylinder 2 to contact the ring convex portion 10 for positioning of the first pipe 3 and the second pipe 4 to the inner cylinder 1.

The first stop ring 6 and the second stop ring 7 are bent inward to easily fit to the first pipe 3 and the second pipe 4, the first pipe 3 is hitched to the inner cylinder 1 by the first stop ring 6, and the second pipe 4 is hitched to the outer cylinder 2 by the second stop ring 7.

When the second pipe 4, in the connected state shown by solid lines in FIG. 1, is pulled in a direction parting from the first pipe 3 by a large earthquake, the outer cylinder 2 hitched on the second pipe 4 slides against the inner cylinder 1 to move with the second pipe 4 in the same direction. When the sliding portion 16 of the outer cylinder 2 contacts the protruding portion 15 of the inner cylinder 1, free sliding is restricted by resistance of the protruding portion 15 to regulate the balance of tensile strength among many joints of the whole pipe line, and the hitching blades 46 of the second stop ring 7 certainly bite into the peripheral face 41 of the second pipe 4 to make the hitching state certain further.

When the second pipe 4 is further pulled toward the right side (in FIG. 1), the sliding portion 16 goes over the protruding portion 15, and the second pipe 4 and the outer cylinder 2 can move to a position that the end 12 of the inner cylinder 1 contacts the inner peripheral face of the sliding portion 16 as shown with two-dot broken lines (in FIG. 1).

During the movement above, the gap of the connected portion of the both pipes 3 and 4 is covered by the inner cylinder 1, rain and foreign matter (object) are prevented from intruding to the pipes by the first seal member 9 and the second seal member 14, the connected portion is covered by the inner cylinder 1 and the outer cylinder 2 not to be exposed and to protect the inside, and an expansion length (stroke) in the axis direction shown with a mark E is secured without intrusion of the foreign matter.

By the gaps 95, an inclination angle .beta. of 1.5.degree. to 5.degree. is achieved with axes of the first pipe 3 and the inner cylinder 1, and an inclination angle of .gamma. 1.5.degree. to 5.degree. is achieved with axes of the second pipe 4 and the outer cylinder 2.

In other words, the gaps 95 are set to make $1.5° \leq \beta \leq 5°$, and $1.5° \leq \gamma \leq 5°$, and both axes $L_3$ and $L_4$ of the first pipe 3 and the second pipe 4 can move from the connected state, in which the both axes correspond, with an inclination angle of 3° to 10° as shown with two-dot broken lines in FIG. 1 when external force such as of earthquake works on the joint. As described above, the both axes $L_3$ and $L_4$ relatively move (bend) to the maximum angle of 10° as the two pipes connected to the pipe joint C has flexibility against the external force.

The first seal member 9 and the second seal member 14 also have a function that prevents compressed air from leaking out of the connected portion of the two pipes 3 and 4 when pressure from compressed air works in the pipes to push a leading line for drawing the cable through the pipes (with a parachute member attached to an end of the leading line).

Next, in the pipe joint C shown in FIGS. 6, 7, and 8, when the second pipe 4, in assembled and connected state shown by solid lines, is pulled in a direction parting from the first pipe 3 by strong external force such as of earthquake, the second sliding portion 39 of the second outer cylinder 25 contacts the second protruding portion 37 formed on the inner cylinder 23 to restrict free sliding of the second outer cylinder 25 to regulate (control) the balance of tensile strength among many joints of the whole pipe line with resistance of the second protruding portion 37. Further, hitching blades of the second stop ring 29 bite into the peripheral face 41 of the second pipe 4 so as to make the hitching state more certain, and the second sliding portion 39 goes over the second protruding portion 37 and moves outward. That is to say, the second pipe 4 and the second outer cylinder 25 can move for a distance ½ E to a position shown with two-dot broken lines.

When the first pipe 3 is pulled in a direction parting from the second pipe 4, the first stop ring 28 is hitched on the peripheral face 31 of the first pipe 3 similar to the second stop ring 29, and the first pipe 3 moves with the first outer cylinder 24 for the same distance of ½ E. That is to say, the expansion length (stroke) shown as E is secured.

While the first pipe 3 and the second pipe 4 move to separate from each other, the connected portion is covered by the inner cylinder 23 and the both outer cylinders 24 and 25 to protect the inside, and rain and foreign matter are prevented from intruding to the pipes by the first seal member 9 and the second seal member 14. Both end portions of both outer cylinders 24 and 25 are protected by the opening end forming members 34 and 35 to prevent the intrusion of the foreign matter.

By the gaps 95, an inclination angle .beta. of 1.5.degree. to 5.degree. is achieved with axes of the first pipe 3 and the first outer cylinder 24, and an inclination angle .gamma. of 1.5.degree. to 5.degree. is achieved with axes of the second pipe 4 and the second outer cylinder 25.

As described above, both axes $L_3$ and $L_4$ of the first pipe 3 and the second pipe 4 can move from the connected state shown with solid lines, in which the both axes of the first pipe 3 and the second pipe 4 correspond, with an inclination angle of 3° to 10° as shown with two-dot broken lines when external force such as of earthquake works on the joint. The first pipe 3 and the second pipe 4 can form the maximum inclination angle of 10° to secure trackability in upper and lower directions with a simple construction.

With the symmetric construction above, assemble work on a site (jobsite) is improved further, and compatibility of the parts is also improved. The assembly is very easily and certainly completed because positioning and attachment are conducted at the same time when the first pipe 3 and the second pipe 4 contact each other.

In the present invention, "cross section" of the peripheral groove portions 81, 82, 91, and 92 is defined as a plane which crosses the peripheral groove portions 81, 82, 91, and 92 continuing in the peripheral direction and "cross-sectional configuration" is defined as a sectional configuration cut by the crossing plane. In other words, "cross section" is defined as a plane including the axes $L_3$ and $L_4$, and "cross-sectional configuration" is defined as a sectional configuration cut by the cross section.

As described above, in the joint construction for cable piping relating to the present invention provided with the inner cylinder 1 having the inner cylinder main body 51 of thin-wall pipe and the outer cylinder 2 fitted to the inner cylinder 1 as to freely slide and having the outer cylinder main body 52 of thin-wall pipe to connect the first pipe 3 for cable and the second pipe 4 for cable as to expand and contract in length, the first pipe 3 and the second pipe 4 can be certainly connected to prevent water and foreign matter (object) from intruding to the connected ends of the pipes because the construction is composed as that the holding ring 5 of the first seal member 9 tightly fit to the peripheral face 31 of the end portion of the first pipe 3, the first stop ring 6 of plate hitching to the peripheral face 31 of the first pipe 3, and the opening end forming member 17 are unitedly attached to the end 11 of the inner cylinder 1 by (simple) plastic working on the inner cylinder main body 51, the holding groove 13 of the second seal member 14 tightly fit to the peripheral face 41 of the end portion of the second pipe 4 is formed to be curved by (simple) plastic working on another end of the inner cylinder main body 51, and the second stop ring 7 hitching to the peripheral face 41 of the second pipe 4 and the opening end forming member 18 are unitedly attached to the outer end 22 of the outer cylinder 2 by (simple) plastic working on the outer end of the outer cylinder main body 52.

Both pipes 3 and 4 have trackability and flexibility against outer force because the second pipe 4 can slide with the outer cylinder in the axis direction when outer force such as of earthquakes works on the joint.

The joint is easily assembled without welding and parts are firmly and certainly fixed because the holding ring 5, the opening end forming members 34 and 35, and the stop rings 6 and 7 are unitedly fit (fixed) by (simple) plastic working of the inner cylinder main body 51 and the outer cylinder main body 52. The number of parts of the joint is reduced preferably to simplify the work on the jobsite.

Further, the holding groove formed by the holding ring 5 and the holding staged portion 8, and the holding groove 13 of the inner cylinder 1, although produced easily, can certainly hold the seal members 9 and 14.

In the joint construction for cable piping provided with the inner cylinder 1 having the inner cylinder main body 51 of thin-wall pipe and the outer cylinder 2 fitted to the inner cylinder 1 so as to freely slide and having the outer cylinder main body 52 of thin-wall pipe to expandably connect the first pipe 3 for cable and the second pipe 4 for cable, the first pipe 3 and the second pipe 4 can be securely connected to prevent water and foreign matter from intruding to the connected ends of the pipes because the construction is composed such that the the outer brim portion 5a formed, at right angles with the axis, on the holding ring 5 tightly fit to the peripheral face 31 of the end portion of the first pipe 3, the outer brim portion 6a formed, at right angles with the axis, on the first stop ring 6 of plate hitching on the peripheral face 31 of the first pipe 3, and the outer brim portion 77 formed, at right angles with the axis, on the opening end forming member 17 are unitedly fitted to the peripheral groove portion 81, of which the cross section is U-shaped opening inward, formed on the end of the inner cylinder main body 51 by (simple) plastic working. The holding ring 5, the first stop ring 6, and the opening end forming member 17 are unitedly attached to the end 11 of the inner cylinder 1. The holding groove 13 of the second seal member 14 tightly fit to the peripheral face 41 of the end portion of the second pipe 4 is formed to be curved and opening inward by (simple) plastic working on another end of the inner cylinder main body 51 the. The outer brim portion 7a formed, at right angles with the axis, on the second stop ring 7 of plate hitching on the peripheral face 41 of the second pipe 4, and the outer brim portion 78 formed, at right angles with the axis, on the opening end forming member 18 are unitedly fitted to the peripheral groove portion 82, of which cross section is U-shaped opening inward, formed on the outer end of the outer cylinder main body 52 by (simple) plastic working. The second stop ring 7 and the opening end forming member 18 are unitedly attached to the outer end 22 of the outer cylinder 2. The holding portion 13A to hold the first seal member 9 is formed as an inward-opening concave groove composed of the inner brim portion 5b formed on the holding ring 5, the holding staged portion 8 formed on the inner cylinder main body 51, and a part of the inner peripheral face of the inner cylinder main body 51.

Both pipes 3 and 4 have trackability and flexibility against an outer force because the second pipe 4 can slide with the outer cylinder in the axis direction when outer force such as of earthquakes works on the joint.

The joint is easily assembled without welding and parts are firmly and certainly fixed because the holding ring 5, the opening end forming members 34 and 35, and the stop rings 6 and 7 are unitedly fit (fixed) by (simple) plastic working of the inner cylinder main body 51 and the outer cylinder main body 52.

The united fitting is made firm and certain further because the outer brim portions of the above members are fitted. And, the number of parts of the joint is reduced preferably to simplify the work on the jobsite.

Further, the holding groove formed by the holding ring 5 and the holding staged portion 8, and the holding groove 13 of the inner cylinder 1, although produced easily, can securely hold the seal members 9 and 14.

The second stop ring 7 can be certainly prevented from being damaged with a simple construction in which the outer cylinder main body 52 has the stopping protrusion 19, which can contact another end 12 of the inner cylinder 1, on the outer end side not to let the end 12 contact the second stop ring 7.

The opening end forming member 17 of the inner cylinder 1 and the opening end forming member 18 of the outer cylinder 2 can be securely fixed to the inner cylinder main body 51 and the outer cylinder main body 52 without labor, such as welding, to make the construction strong because the opening end forming member 17 has the outer brim portion 77 fitted by the (simple) plastic working and the tapered short cylinder portion 87 increasing in diameter toward the outer side in the axis direction, and the opening end forming member 18 has the outer brim portion 78 fitted by the (simple) plastic working and the tapered short cylinder portion 88 increasing in diameter toward the outer side in the axis direction. Foreign matter is prevented from intruding to the connected ends of the pipes, and the second pipe 4 is easily inserted to the outer cylinder 2.

Foreign matter is prevented from intruding to the connected ends of the first pipe 3 and the second pipe 4, and the second pipe 4 is easily inserted to the outer cylinder 2 because the opening end forming member 17 has the tapered short cylinder portion 87 increasing in diameter toward the outer side in the axis direction, and the opening end forming member 18 has the tapered short cylinder portion 88 increasing in diameter toward the outer side in the axis direction, Water is prevented from intruding to the connected ends of the first pipe 3 and the second pipe 4 because each of the first seal member 9 and the second seal member 14 has two rows of sealing tongue portions 44 and 45 protruding inward. Further, compressed air is prevented from leaking out of the connected part of the two pipes 3 and 4 when pressure of the compressed air works in the pipes to push a lead-in wire for drawing the cable through the pipes (with a member of parachute configuration attached to a forward end of the lead-in wire).

Each of the hitching blades 46 disposed on inner sides of the first and second stop rings 6 and 7 has a small convex portion 48 for reinforcement to increase strength and rigidity of the hitching blade 46 as easily bites into the peripheral face 31 of the first pipe 3 and the peripheral face 41 of the second pipe 4 to make the connection of the both pipes 3 and 4 strong further.

In another embodiment of the joint construction for cable piping provided with the inner cylinder 23 having the inner cylinder main body 63 of thin-wall pipe, the first outer cylinder 24 fitted to the inner cylinder 23 so as to freely slide and having the first outer cylinder main body 64, and the second outer cylinder 25 fitted to the inner cylinder 23 so as to freely slide and having the second outer cylinder main body 65 of thin-wall pipe to expandably connect the first pipe 3 for cable and the second pipe 4 for cable, the first pipe 3 and the second pipe 4 can be firmly and certainly connected to prevent water and foreign matter (object) from intruding to the connected ends of the pipes because the construction is composed such that the holding groove 26 of the first seal member 9 tightly fit to the peripheral face 31 of the end portion of the first pipe 3 is formed as to be curved on the end 49 of the inner cylinder 23 by (simple) plastic working on the end side of the inner cylinder main body 63, the holding groove 27 of the second seal member 14 tightly fit to the peripheral face 41 of the end portion of the second pipe 4 is formed as to be curved on the end 50 of the inner cylinder 23 by (simple) plastic working on another end side of the inner cylinder main body 63, the first stop ring 28 hitching to the peripheral face 31 of the first pipe 3 and the opening end forming member 34 are unitedly attached to an outer end 42 of the first outer cylinder 24 by (simple) plastic working on the outer end of the first outer cylinder main body 64, and the second stop ring 29 hitching to the peripheral face 41 of the second pipe 4 and the opening end forming member 35 are unitedly attached to the outer end 43 of the second outer cylinder 25 by (simple) plastic working on the outer end of the second outer cylinder main body 65.

Both pipes 3 and 4 have trackability because the first pipe 3 can slide with the first outer cylinder 24 and the second pipe 4 can slide with the second outer cylinder 25 in the axis direction when outer force such as of earthquakes works on the joint.

The joint is easily assembled without labor such as welding and parts are firmly and certainly fixed because the opening end forming members 34 and 35, and the stop rings 6 and 7 are unitedly fit (fixed) by (simple) plastic working of the outer cylinder main bodies 64 and 65. The number of parts of the joint is reduced preferably to simplify the work on the jobsite.

Further, the holding grooves 26 and 27, although having simple construction and produced easily, can certainly hold the seal members 9 and 14.

In the joint construction provided with the inner cylinder 23 having the inner cylinder main body 63 of thin-wall pipe, the first outer cylinder 24 fitted to the inner cylinder 23 so as to freely slide and having the first outer cylinder main body 64, and the second outer cylinder 25 fitted to the inner cylinder 23 so as to freely slide and having the second outer cylinder main body 65 of thin-wall pipe to expandably connect the first pipe 3 for cable and the second pipe 4 for cable, the first pipe 3 and the second pipe 4 can be firmly and securely connected to prevent water and foreign matter from intruding to the connected ends of the pipes because the construction is composed such that the holding groove 26 of the first seal member 9 tightly fit to the peripheral face 31 of the end portion of the first pipe 3 is formed so as to be curved and opening to the inside diameter direction, the holding groove 27 of the second seal member 14 tightly fit to the peripheral face 41 of the end portion of the second pipe 4 is formed as to be curved and opening to the inside diameter direction, the outer brim portion 28a at right angles with the axis formed on the first stop ring 28 hitching to the peripheral face 31 of the first pipe 3 and the outer brim portion 74 at right angles with the axis formed on the opening end forming member 34 are unitedly fitted by (simple) plastic working to the peripheral groove portion 91, of which the cross section is U-shaped opening to the inside diameter direction, formed on the outer end side of the first outer cylinder main body 64. The first stop ring 28 and the opening end forming member 34 are unitedly attached to the outer end 42 of the first outer cylinder 24. The outer brim portion 29a formed, at right angles with the axis, on the second stop ring 29 hitching to the peripheral face 41 of the second pipe 4 and the outer brim portion 75 formed, at right angles with the axis, on the opening end forming member 35 are unitedly fitted by (simple) plastic working to the peripheral groove portion 92, of which the cross section is U-shaped opening to the inside diameter direction, formed on the outer end side of the second outer cylinder main body 65, and the second stop ring 29 and the opening end forming member 35 are unitedly attached to the outer end 43 of the second outer cylinder 25.

Both pipes 3 and 4 have trackability because the first pipe 3 can slide with the first outer cylinder 24 and the second pipe 4 can slide with the second outer cylinder 25 in the axis direction when outer force such as of earthquakes works on the joint.

The joint is easily assembled without labor such as welding and parts are firmly and certainly fixed because the opening end forming members 34 and 35, and the stop rings 6 and 7 are unitedly fit (fixed) by (simple) plastic working of the outer cylinder main bodies 64 and 65.

The united fitting is made firm and certain further because the outer brim portions of the above members are fitted. The number of parts of the joint is reduced preferably to simplify the work on the jobsite.

Further, the holding grooves 26 and 27, although having simple construction and produced easily, can securely hold the seal members 9 and 14.

The first stop ring 28 and the second stop ring 29 can be certainly prevented from being damaged with a simple construction in which the first outer cylinder main body 64 has the stopping protrusion 40, which can contact the end 49 of the inner cylinder 23, on the outer end side not to let the end 49 contact the first stop ring 28, the second outer cylinder main body 65 has the stopping protrusion 80, which can contact the end 50 of the inner cylinder 23, on the outer end side not to let the end 50 contact the second stop ring 29.

The opening end forming members 34 and 35 can be securely fixed to the first and second outer cylinder main bodies 64 and 65 to have a strong construction without labor, such as welding, because the opening end forming member 34 has the outer brim portion 74 fitted by the (simple) plastic working and the tapered short cylinder portion 84 increasing in diameter toward the outer side in the axis direction, and the opening end forming member 35 has the outer brim portion 75 fitted by the (simple) plastic working and the tapered short cylinder portion 85 increasing in diameter toward the outer side in the axis direction.

Foreign matter is prevented from intruding to the connected ends of the first pipe 3 and the second pipe 4, and the first pipe 3 and the second pipe 4 can be easily inserted to the inner cylinder 23.

Foreign matter is prevented from intruding to the connected ends of the first pipe 3 and the second pipe 4, and the first pipe 3 and the second pipe 4 can be easily inserted to the inner cylinder 23 because the opening end forming members 34 and 35 respectively have the tapered short cylinder portions 84 and 85 increasing in diameter toward the outer side in the axis direction.

Water is prevented from intruding to the connected ends of the first pipe 3 and the second pipe 4 because each of the first seal member 9 and the second seal member 14 has two rows of sealing tongue portions 44 and 45 protruding inward. Further, compressed air is prevented from leaking out of the connected part of the two pipes 3 and 4 when pressure of the compressed air works in the pipes to push a lead-in wire for drawing the cable through the pipes (with a member of parachute configuration attached to a forward end of the lead-in wire).

Each of the hitching blades 46 disposed on inner sides of the first and second stop rings 28 and 29 has a small convex portion 48 for reinforcement to increase strength and rigidity of the hitching blade 46 as easily bites into the peripheral face 31 of the first pipe 3 and the peripheral face 41 of the second pipe 4 to make the connection of the both pipes 3 and 4 strong further.

While preferred embodiments of the present invention have been described in this specification, it is to be understood that the invention is illustrative and not restrictive, because various changes are possible within the spirit and indispensable features.

What is claimed is:

1. A joint construction for cable piping provided with an inner cylinder having an inner cylinder main body of thin-wall pipe and an outer cylinder fitted to the inner cylinder so as to freely slide, and having an outer cylinder main body of thin-wall pipe to connect a first pipe for cable and a second pipe for cable so as to expand and contract in length, comprising:
    a holding ring of a first seal member tightly fit to a peripheral face of an end portion of the first pipe, a first stop ring of plate hitching to the peripheral face of the first pipe, and an opening end forming member, all of which are unitedly attached to an end of the inner cylinder by plastic working on the inner cylinder main body;
    a holding groove of a second seal member tightly fit to a peripheral face of an end portion of the second pipe formed to be curved by plastic working on another end of the inner cylinder main body; and
    a second stop ring hitching to a peripheral face of the second pipe and an opening end forming member which are unitedly attached to an outer end of the outer cylinder by plastic working on an outer end of the outer cylinder main body.

2. A joint construction for cable piping provided with an inner cylinder having an inner cylinder main body of thin-wall pipe and an outer cylinder fitted to the inner cylinder so as to freely slide and having an outer cylinder main body of thin-wall pipe to connect a first pipe for cable and a second pipe for cable so as to expand and contract in length, comprising:
    an outer brim portion formed, at right angles with an axis, on a holding ring tightly fit to a peripheral face of an end portion of the first pipe, an outer brim portion formed, at right angles with an axis, on a first stop ring of plate hitching on the peripheral face of the first pipe, and an outer brim portion formed, at right angles with an axis, on an opening end forming member, all of which are unitedly fitted to a peripheral groove portion, of which a cross section is U-shaped opening inward, formed on an end of the inner cylinder main body by plastic working;
    the holding ring, the first stop ring, and the opening end forming member being unitedly attached to an end of the inner cylinder;
    a holding groove of a second seal member tightly fit to a peripheral face of an end portion of the second pipe which is formed to be curved and opening inward by plastic working on another end of the inner cylinder main body;
    an outer brim portion formed, at right angles with the axis, on a second stop ring of plate hitching on a peripheral face of the second pipe, and an outer brim portion formed, at right angles with the axis, on an opening end forming member, both of which are unitedly fitted to a peripheral groove portion, of which a cross section is a U-shaped opening inward, formed on an outer end of the outer cylinder main body by plastic working;
    the second stop ring and the opening end forming member being unitedly attached to an outer end of the outer cylinder; and
    a holding portion to hold the first seal member being formed as an inward-opening concave groove composed of an inner brim portion formed on the holding ring, a holding staged portion formed on the inner cylinder main body, and a part of an inner peripheral face of the inner cylinder main body.

3. The joint construction for cable piping as set forth in claim 1 or claim 2, wherein the outer cylinder main body has a stopping protrusion, which can contact another end of the inner cylinder, on the outer end side so as to prevent the end of the inner cylinder from contacting the second stop ring.

4. The joint construction for cable piping as set forth in claim 1 or claim 2, wherein the opening end forming member has an outer brim portion fitted by the plastic working and a tapered short cylinder portion increasing in diameter toward an outer side in the axis direction, and the opening end forming member has an outer brim portion fitted by the plastic working and a tapered short cylinder portion increasing in diameter toward an outer side in the axis direction.

5. The joint construction for cable piping as set forth in claim 1 or claim 2, wherein each of the first seal member and the second seal member has two rows of sealing tongue portions protruding inward.

6. The joint construction for cable piping as set forth in claim 1 or claim 2, wherein each of hitching blades, disposed on inner sides of the first stop ring and the second stop ring, has a small convex portion for reinforcement.

7. A joint construction for cable piping provided with an inner cylinder having an inner cylinder main body of thin-wall pipe, a first outer cylinder fitted to the inner cylinder as to freely slide and having a first outer cylinder main body, and a second outer cylinder fitted to the inner cylinder as to freely slide and having a second outer cylinder main body of thin-wall pipe to connect a first pipe for cable and a second pipe for cable as to expand and contract in length, comprising:
- a holding groove of a first seal member tightly fit to a peripheral face of an end portion of the first pipe being formed so as to be curved on an end of the inner cylinder by plastic working on an end side of the inner cylinder main body;
- a holding groove of a second seal member tightly fit to a peripheral face of an end portion of the second pipe being formed so as to be curved on another end of the inner cylinder by plastic working on another end side of the inner cylinder main body;
- a first stop ring hitching to the peripheral face of the first pipe and an opening end forming member being unitedly attached to an outer end of the first outer cylinder by plastic working on an outer end of the first outer cylinder main body; and
- a second stop ring hitching to the peripheral face of the second pipe and an opening end forming member being unitedly attached to an outer end of the second outer cylinder by plastic working on an outer end of the second outer cylinder main body.

8. A joint construction for cable piping provided with an inner cylinder having an inner cylinder main body of thin-wall pipe, a first outer cylinder fitted to the inner cylinder as to freely slide and having a first outer cylinder main body, and a second outer cylinder fitted to the inner cylinder as to freely slide and having a second outer cylinder main body of thin-wall pipe to connect a first pipe for cable and a second pipe for cable as to expand and contract in length, comprising:
- a holding groove of a first seal member tightly fit to a peripheral face of an end portion of the first pipe being formed so as to be curved and opening to an inside diameter direction by plastic working on an end side of the inner cylinder main body;
- a holding groove of a second seal member tightly fit to a peripheral face of an end portion of the second pipe being formed so as to be curved and opening to the inside diameter direction by plastic working on another end side of the inner cylinder main body;
- an outer brim portion formed, at right angles with an axis, on a first stop ring hitching to the peripheral face of the first pipe and an outer brim portion at right angles with the axis formed on an opening end forming member, both of which are unitedly fitted by plastic working to a peripheral groove portion, of which a cross section is a U-shaped opening to the inside diameter direction, formed on an outer end side of the first outer cylinder main body;
- the first stop ring and the opening end forming member being unitedly attached to an outer end of the first outer cylinder;
- an outer brim portion formed, at right angles with the axis, on a second stop ring hitching to the peripheral face of the second pipe and an outer brim portion formed, at right angles with the axis, on an opening end forming member, both of which are unitedly fitted by plastic working to a peripheral groove portion, of which a cross section is U-shaped opening to the inside diameter direction, formed on an outer end side of the second outer cylinder main body; and
- the second stop ring and the opening end forming member being unitedly attached to an outer end of the second outer cylinder.

9. The joint construction for cable piping as set forth in claim 7 or claim 8, wherein the first outer cylinder main body has a stopping protrusion, which can contact an end of the inner cylinder, on the outer end side not to let the end of the inner cylinder contact the first stop ring, and, the second outer cylinder main body has a stopping protrusion, which can contact another end of the inner cylinder, on the outer end side so as to prevent the end of the inner cylinder from contacting the second stop ring.

10. The joint construction for cable piping as set forth in claim 7 or claim 8, wherein the opening end forming member has an outer brim portion fitted by the plastic working and a tapered short cylinder portion increasing in diameter toward an outer side in the axis direction, and the opening end forming member has an outer brim portion fitted by the plastic working and a tapered short cylinder portion increasing in diameter toward an outer side in the axis direction.

11. The joint construction for cable piping as set forth in claim 7 or claim 8, wherein each of the first seal member and the second seal member has two rows of sealing tongue portions protruding inward.

12. The joint construction for cable piping as set forth in claim 7 or claim 8, wherein each of hitching blades, disposed on inner sides of the first stop ring and the second stop ring, has a small convex portion for reinforcement.

* * * * *